United States Patent
Zehntner

(10) Patent No.: US 12,491,142 B2
(45) Date of Patent: Dec. 9, 2025

(54) BABY WASH/SHAMPOO

(71) Applicant: Melaleuca, Inc., Idaho Falls, ID (US)

(72) Inventor: Rebecca L. Zehntner, Blackfoot, ID (US)

(73) Assignee: Melaleuca, Inc., Idaho Falls, ID (US)

( * ) Notice: Subject to any disclaimer, the term of this patent is extended or adjusted under 35 U.S.C. 154(b) by 9 days.

(21) Appl. No.: 17/565,952

(22) Filed: Dec. 30, 2021

(65) Prior Publication Data

US 2022/0202664 A1 Jun. 30, 2022

Related U.S. Application Data

(60) Provisional application No. 63/133,037, filed on Dec. 31, 2020.

(51) Int. Cl.

| | |
|---|---|
| A61K 8/42 | (2006.01) |
| A61K 8/04 | (2006.01) |
| A61K 8/34 | (2006.01) |
| A61K 8/365 | (2006.01) |
| A61K 8/44 | (2006.01) |
| A61K 8/46 | (2006.01) |
| A61K 8/49 | (2006.01) |
| A61K 8/73 | (2006.01) |
| A61K 8/92 | (2006.01) |
| A61Q 5/02 | (2006.01) |
| A61Q 19/10 | (2006.01) |

(52) U.S. Cl.
CPC ............. *A61K 8/046* (2013.01); *A61K 8/342* (2013.01); *A61K 8/345* (2013.01); *A61K 8/365* (2013.01); *A61K 8/42* (2013.01); *A61K 8/44* (2013.01); *A61K 8/442* (2013.01); *A61K 8/463* (2013.01); *A61K 8/498* (2013.01); *A61K 8/73* (2013.01); *A61K 8/922* (2013.01); *A61Q 5/02* (2013.01); *A61Q 19/10* (2013.01); *A61K 2800/75* (2013.01)

(58) Field of Classification Search
CPC .......... A61K 8/046; A61K 8/463; A61K 8/44; A61K 8/42; A61K 8/922; A61K 9/345; A61K 8/73; A61K 8/365; A61K 8/342; A61K 8/492; A61K 8/422; A61K 2800/75; A61Q 19/10; A61Q 5/02
See application file for complete search history.

(56) References Cited

U.S. PATENT DOCUMENTS

| | | | |
|---|---|---|---|
| 2003/0031727 A1 | 2/2003 | Hahn et al. | |
| 2011/0015279 A1 | 1/2011 | Doerr et al. | |
| 2013/0230609 A1* | 9/2013 | Modak | A61P 17/10 |
| | | | 424/769 |
| 2014/0190507 A9 | 7/2014 | Xavier et al. | |
| 2015/0044157 A1* | 2/2015 | Kulkarni | A61K 8/602 |
| | | | 514/561 |
| 2015/0118165 A1 | 4/2015 | Rudolph et al. | |
| 2015/0147357 A1 | 5/2015 | Gan et al. | |
| 2015/0342854 A1 | 12/2015 | Shibuya et al. | |
| 2017/0095411 A1* | 4/2017 | Cotrell | A61P 17/00 |
| 2017/0258709 A1* | 9/2017 | Carle | A61Q 19/007 |
| 2018/0071190 A1 | 3/2018 | Albrecht et al. | |
| 2019/0105243 A1 | 4/2019 | Song et al. | |
| 2020/0330381 A1 | 10/2020 | Burnam | |
| 2022/0202672 A1 | 6/2022 | Zehntner | |
| 2022/0202761 A1 | 6/2022 | Zehntner | |

FOREIGN PATENT DOCUMENTS

| | | | | |
|---|---|---|---|---|
| DE | 102013226281 A1 * | 6/2015 | ............. | A61K 8/365 |
| EP | 2939657 | 12/2013 | | |
| EP | 3300715 | 4/2018 | | |
| EP | 3554465 | 9/2022 | | |
| RU | 2657805 C1 * | 6/2018 | ............... | A61K 8/19 |
| RU | 2716157 C1 * | 3/2020 | ............... | A61K 8/18 |
| WO | WO-2019055961 A1 * | 3/2019 | ............. | A61K 8/042 |
| WO | WO-2020160904 A1 * | 8/2020 | ............. | A61K 8/375 |

OTHER PUBLICATIONS

RU 2716157 Eng Tran. Published: Mar. 2020.*
Baby Shampoo. https://www.todaysparent.com/product-reviews/baby-care/baby-shampoo/weleda-baby-calendula-shampoo-and-body-wash/. Published: Jan. 29, 2018.*
Newsweek. https://www.newsweek.com/science-shampoo-what-ingredients-mean-222524. Published: Oct. 8, 2009.*
Glucotain. https://www.essentialingredients.com/pdf/ClariantGlucoTainHaircareBrochure.pdf. Published: 2016.*
Choksi.Cutan Ocul Toxicol. Sep. 2020 ; 39(3): 180-192.*
Singh. Advances in Cosmetic Formulation Design; Published Jul. 24, 2018.*
DE102013226281 Eng Tran. Published: Jun. 18, 2015.*
Singh. "Sulfate free solutions for personal care applications" in "Advances in Cosmetic Formulation Design", ECI Symposium Series, (2018). http://dc.engconfintl.org/cosmetic/29.*
RU2657805 Eng Tran. Published: Jun. 15, 2018.*
EQLib.ca [online], "Baby Shampoo Natural 2 in 1 Koala Kubs—Double," available on or before Apr. 18, 2021, via Internet Archive: Wayback Machine URL<https://web.archive.org/web/20210418061001/https://eqlib.ca/produit/produits-pour-bebes-et-enfants/shampooing-bebe-naturel-2-en-1-koala-kubs-double/>, retrieved on May 4, 2022, retrieved from URL<https://eqlib.ca/produit/produits-pour-bebes-et-enfants/shampooing-bebe-naturel-2-en-1-koala-kubs-double/>, 10 pages (with Machine English Translation).

(Continued)

*Primary Examiner* — Nicole P Babson
*Assistant Examiner* — Lori K Mattison
(74) *Attorney, Agent, or Firm* — Fish & Richardson P.C.

(57) ABSTRACT

Materials and methods for formulating a baby wash/shampoo are provided herein. For example, this document provides materials and methods for formulating a foaming baby wash/shampoo compositions that contain natural ingredients and are not irritating to babies' skin and eyes.

15 Claims, No Drawings

(56) References Cited

OTHER PUBLICATIONS

EQLib.ca [online], "Koala Kubs Natural Baby Lotion—Double," available on or before Apr. 18, 2021, via Internet Archive: Wayback Machine URL<https://web.archive.org/web/20210418050002/https://eqlib.ca/produit/produits-pour-bebes-et-enfants/lotion-pour-bebe-naturelle/>, retrieved on May 4, 2022, retrieved from URL<https://eqlib.ca/produit/produits-pour-bebes-et-enfants/lotion-pour-bebe-naturelle/>, 10 pages (with Machine English Translation).
PCT International Search Report and Written Opinion in International Appln. No. PCT/US2021/065653, dated Mar. 25, 2022, 8 pages.
SharaCosmetics.com [online], "Waterproof Gel Liner," available on or before Sep. 29, 2020, via Internet Archive: Wayback Machine URL<https://web.archive.org/web/20200929204228/https://www.sharacosmetics.com/product-page/waterproof-gel-liner>, retrieved on May 4, 2022, retrieved from URL<https://www.sharacosmetics.com/product-page/waterproof-gel-liner>, 2 pages.
PCT International Preliminary Report on Patentability in International Appln. No. PCT/US2021/065653, mailed on Jul. 13, 2023, 7 pages.
Ilnytska et al., "Colloidal oatmeal (*Avena sativa*) improves skin barrier through multi-therapy activity," J. Drugs Dermatol., Jun. 2016, 15(6):684-690.

\* cited by examiner

BABY WASH/SHAMPOO

CROSS-REFERENCE TO RELATED APPLICATIONS

This application claims benefit of priority from U.S. Provisional Application Ser. No. 63/133,037, filed Dec. 31, 2020. The disclosure of the prior application is considered part of (and is incorporated by reference in) the disclosure of this application.

TECHNICAL FIELD

This document relates to materials and methods for formulating baby wash/shampoo compositions. For example, this document relates to materials and methods for formulating foaming baby wash/shampoo compositions that contain natural ingredients and are not irritating to babies' skin and eyes.

BACKGROUND

Young children, including babies and toddlers, typically have sensitive, delicate skin. Skin care products (e.g., soaps and shampoos) designed for adult use are generally not suitable for use with small children.

SUMMARY

This document is based, at least in part, on the development of foaming compositions that are suitable for use as a body wash and/or shampoo on young children. The compositions provided herein contain natural and safe ingredients, resulting in products that are low (or non-) irritating to babies' skin and eyes. For example, the compositions provided herein are not likely to produce a stinging or burning sensation if they get into a baby's eyes, and they can be classified as "tear-free."

In a first aspect, this document features a foaming composition that contains sodium cocoyl isethionate, sodium cocoyl glutamate, capryloyl/caproyl methyl glucamide, lauroyl/myristyoyl methyl glucamide, coco-betaine, a *Calendula officinalis* extract, glycerin, saccharide isomerate, citric acid, and sodium citrate. The composition can contain from about 0.02 to about 20% w/w sodium cocoyl glutamate. The composition can contain from about 0.03 to about 3% w/w capryloyl/caproyl methyl glucamide. The composition can contain from about 0.1 to about 13% w/w lauroyl/myristyoyl methyl glucamide. The composition can contain from about 0.1 to about 12% w/w coco-betaine. The composition can contain from about 0.0005 to about 0.05% w/w *C. officinalis* extract. The composition can contain from about 0.003 to about 0.3% w/w saccharide isomerate. The composition can further comprise citric acid. The composition can contain from about 0.04 to about 4% w/w citric acid. The composition can further comprise sodium citrate. The composition can contain from about 0.000025 to about 0.00025% w/w sodium citrate. The composition can contain from about 0.2 to about 20% w/w sodium cocoyl isethionate. The composition can further include trisodium ethylenediamine disuccinate. The composition can contain from about 0.002 to about 0.2% w/w trisodium ethylenediamine disuccinate. The composition can further include benzyl alcohol. The composition can contain from about 0.08 to about 8% w/w benzyl alcohol. The composition can further include ethylhexylglycerin. The composition can contain from about 0.018 to about 1.8% w/w ethylhexylglycerin. The composition can further include tocopherol. The composition can contain from about 0.0001 to about 0.01% w/w tocopherol. The composition can be non-irritating to eyes and can be classified as "tear free." The composition can have a viscosity less than 150 centipoise.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the description below. Other features, objects, and advantages of the invention will be apparent from the description and from the claims.

DETAILED DESCRIPTION

This document provides foaming baby wash and/or shampoo compositions containing ingredients that are safe for use on young children. The compositions provided herein are low irritating (e.g., non-irritating) and hypoallergenic, and contain natural (plant-derived) ingredients such as glycerin, *Calendula officinalis* flower extract, and plant-based fragrances. The compositions also can be classified as "tear-free," based at least in part on clinical testing performed against a competitive product (e.g., Johnson and Johnson's baby shampoo) to assess dilutions of a composition for eye irritation, and on ophthalmologist reviews.

The compositions provided herein can contain any appropriate ingredients, including, without limitation, one or more surfactants, humectants, moisturizers, preservatives, fragrances, pH adjustors, chelating agents, emollients, skin-conditioning agents, emulsifiers, and stabilizers. Examples of components that can be included in the compositions provided herein are as follows.

Sodium cocoyl glutamate is a plant-derived surfactant. In some cases, the compositions provided herein can contain sodium cocoyl glutamate in an amount from about 0.2 to about 20% w/w (e.g., from about 0.2 to about 1% w/w, from about 1 to about 2% w/w, from about 2 to about 5% w/w, from about 5 to about 10% w/w, or from about 10 to about 20% w/w). In some cases, sodium cocoyl glutamate can be present in a composition provided herein in an amount from about 1 to about 3% w/w (e.g., from about 1.5 to about 2.5 w/w).

Sodium cocoyl isethionate also is a plant-derived surfactant. In some cases, the compositions provided herein can contain sodium cocoyl isethionate in an amount from about 0.2 to about 20% w/w (e.g., from about 0.2 to about 1% w/w, from about 1 to about 2% w/w, from about 2 to about 5% w/w, from about 5 to about 10% w/w, or from about 10 to about 20% w/w). In some cases, sodium cocoyl isethionate can be present in a composition provided herein in an amount from about 0.9 to about 2.7% w/w (e.g., from about 1.4 to about 2.2% w/w).

Lauroyl/myristoyl methyl glucamide is a mild, thickening, plant-derived surfactant. In some cases, the compositions provided herein can contain lauroyl/myristoyl methyl glucamide in an amount from about 0.1 to about 13% w/w (e.g., from about 0.1 to about 0.8% w/w, from about 0.8 to about 2% w/w, from about 2 to about 5% w/w, from about 5 to about 10% w/w, or from about 10 to about 13% w/w). In some cases, lauroyl/myristoyl methyl glucamide can be present in a composition provided herein in an amount from about 0.65 to about 2% w/w (e.g., from about 1 to about 1.5% w/w).

Capryloyl/caproyl methyl glucamide is a mild, foam-boosting, plant-derived surfactant. In some cases, the compositions provided herein can contain Capryloyl/caproyl methyl glucamide in an amount from about 0.03 to about 3% w/w (e.g., from about 0.03 to about 0.1% w/w, from about 0.1 to about 0.5% w/w, from about 0.5 to about 1% w/w, from about 1 to about 2% w/w, or from about 2 to about 3% w/w). In some cases, capryloyl/caproyl methyl glucamide can be present in a composition provided herein in an amount from about 0.15 to about 0.45% w/w (e.g., from about 0.20 to about 0.4% w/w).

Coco-betaine is another plant-derived surfactant. In some cases, the compositions provided herein can contain coco-betaine in an amount from about 0.1 to about 12% w/w (e.g., from about 0.1 to about 0.7% w/w, from about 0.7 to about 1.7% w/w, from about 1.7 to about 3% w/w, from about 3 to about 8% w/w, or from about 8 to about 12% w/w). In some cases, coco-betaine can be present in a composition provided herein in an amount from about 0.6 to about 1.8% w/w (e.g., from about 1 to about 1.4% w/w).

*Calendula officinalis* flower extract (also referred to as *Calendula* oil) is a moisturizer and emollient that can condition and soothe the skin. In some cases, the compositions provided herein can contain a *C. officinalis* extract in an amount from about 0.0005 to about 0.05% w/w (e.g., from about 0.0005 to about 0.001% w/w, from about 0.001 to about 0.005% w/w, from about 0.005 to about 0.01% w/w, or from about 0.01 to about 0.05% w/w). In some cases, a *C. officinalis* flower extract can be present in a composition provided herein in an amount from about 0.0025 to about 0.0075% w/w (e.g., from about 0.004 to about 0.006% w/w).

Citric acid is a plant-derived pH adjustor. In some cases, the compositions provided herein can contain citric acid in an amount from about 0.04 to about 4% w/w (e.g., from about 0.04 to about 0.2% w/w, from about 0.2 to about 0.4% w/w, from about 0.4 to about 1% w/w, from about 1 to about 2% w/w, or from about 2 to about 4% w/w). In some cases, citric acid can be present in a composition provided herein in an amount from about 0.2 to about 0.6% w/w (e.g., about 0.25 to about 0.55% w/w).

Sodium citrate also is a plant-derived pH adjustor. In some cases, the compositions provided herein can contain coco-betaine in an amount from about 0.000025 to about 0.0025% w/w (e.g., from about 0.000025 to about 0.0001% w/w, from about 0.0001 to about 0.0002% w/w, from about 0.0002 to about 0.001% w/w, or from about 0.001 to about 0.0025% w/w). In some cases, sodium citrate can be present in a composition provided herein in an amount from about 0.00013 to about 0.00038% w/w (e.g., from about 0.0002 to about 0.0003% w/w).

Saccharide isomerate is a plant-derived humectant. In some cases, the compositions provided herein can contain saccharide isomerate in an amount from about 0.003 to about 0.3% w/w (e.g., from about 0.003 to about 0.01% w/w, from about 0.01 to about 0.3% w/w, from about 0.3 to about 0.7% w/w, from about 0.7 to about 1.5% w/w, or from about 1.5 to about 3% w/w). In some cases, saccharide isomerate can be present in a composition provided herein in an amount from about 0.02 to about 0.05% w/w (e.g., from about 0.03 to about 0.04% w/w).

Glycerin is a humectant that can draw moisture into the skin, and can be plant-derived. In some cases, the compositions provided herein can contain glycerin in an amount from about 0.1 to about 10% w/w (e.g., from about 0.1 to about 0.5% w/w, from about 0.5 to about 1% w/w, from about 1 to about 5% w/w, or from about 5 to about 10% w/w). In some cases, glycerin can be present in a composition provided herein in an amount from about 0.5 to about 1.5% w/w (e.g., from about 0.8 to about 1.2% w/w).

Benzyl alcohol is a preservative. In some cases, the compositions provided herein can contain benzyl alcohol in an amount from about 0.08 to about 8% w/w (e.g., from about 0.08 to about 0.5% w/w, from about 0.5 to about 1% w/w, from about 1 to about 2% w/w, from about 2 to about 4% w/w, or from about 4 to about 8% w/w). In some cases, benzyl alcohol can be present in a composition provided herein in an amount from about 0.4 to about 1.2% w/w (e.g., from about 0.6 to about 1 w/w).

Ethylhexylglycerin also is a preservative. In some cases, the compositions provided herein can contain ethylhexylglycerin in an amount from about 0.018 to about 1.8% w/w (e.g., from about 0.018 to about 0.05% w/w, from about 0.05 to about 0.1% w/w, from about 0.1 to about 0.2% w/w, from about 0.2 to about 1% w/w, or from about 1 to about 1.8% w/w). In some cases, ethylhexylglycerin can be present in a composition provided herein in an amount from about 0.09 to about 0.27% w/w (e.g., from about 0.14 to about 0.22% w/w).

Trisodium ethylenediamine disuccinate is a chelating agent. In some cases, the compositions provided herein can contain trisodium ethylenediamine disuccinate in an amount from about 0.002 to about 0.2% w/w (e.g., from about 0.002 to about 0.008% w/w, from about 0.008 to about 0.015% w/w, from about 0.015 to about 0.025% w/w, from about 0.025 to about 0.1% w/w, or from about 0.1 to about 0.2% w/w). In some cases, trisodium ethylenediamine disuccinate can be present in a composition provided herein in an amount from about 0.01 to about 0.03% w/w (e.g., from about 0.015 to about 0.025 w/w).

Tocopherol is an emollient. In some cases, the compositions provided herein can contain tocopherol in an amount from about 0.0001 to about 0.01% w/w (e.g., from about 0.0001 to about 0.0005% w/w, from about 0.0005 to about 0.001% w/w, from about 0.001 to about 0.005% w/w, or from about 0.005 to about 0.01% w/w). In some cases, tocopherol can be present in a composition provided herein in an amount from about 0.0005 to about 0.0015% w/w (e.g., about 0.0008 to about 0.0012% w/w).

The compositions provided herein also can contain one or more fragrance compounds. In some cases, the compositions provided herein can contain one or more fragrance compounds in an amount from about 0.05 to about 5% w/w (e.g., from about 0.05 to about 0.1% w/w, from about 0.1 to about 0.5% w/w, from about 0.5 to about 1% w/w, from about 1 to about 2.5% w/w, or from about 2.5 to about 5% w/w). In some cases, fragrance compounds can be present in a composition provided herein in an amount of about 0.5% w/w (e.g., about 0.48 to about 0.52% w/w).

In addition, the compositions provided herein can include water, which can make up the remainder of the composition apart from the other ingredients. In some cases, the compositions provided herein can contain water in an amount from about 80 to about 95% w/w (e.g., from about 80 to about 85% w/w, from about 85 to about 88% w/w, from about 88 to about 90% w/w, from about 90 to about 92% w/w, or from about 92 to about 95% w/w). In some cases, water can be present in a composition provided herein in an amount of about 90% w/w (e.g., about 89 to about 91% w/w).

Any appropriate combination of the ingredients listed above can be used in the compositions provided herein. In some cases, for example, a composition can include sodium cocoyl glutamate, capryloyl/caproyl methyl glucamide, lauroyl/myristyoyl methyl glucamide, coco-betaine, a *C. officinalis* extract, glycerin, saccharide isomerate, citric acid, and sodium citrate. In addition, in some cases, a composition provided herein also can include any one or more of the other ingredients listed above. Moreover, a composition provided herein can further include any other appropriate ingredient (e.g., any other suitable surfactant, humectant, moisturizer, preservative, fragrance, pH adjustor, chelating agent, or emollient).

The compositions described herein can have any appropriate pH. In general, the pH of the compositions is such that they are low irritating (e.g., non-irritating) to the skin or eyes. In some cases, a composition provided herein can have a pH of about 5 to about 6 (e.g., from about 5.0 to about 5.3, from about 5.2 to about 5.5, from about 5.4 to about 5.7, or from about 5.7 to about 6.0).

The compositions provided herein also can have any appropriate viscosity. In some cases, a foaming baby wash/shampoo composition provided herein can have a viscosity that is less than 300 centipoise (cps) (e.g., less than 250 cps, less than 200 cps, or less than 150 cps).

The invention will be further described in the following example, which does not limit the scope of the invention described in the claims.

Example

A concept study was conducted through an online survey to assess the attitudes and usage of more than 280 mothers of children aged two years and under. Children of the survey participants were about 50:50 boy:girl, and about 50:50 baby:toddler. Participants indicated that they were open to using a natural baby care product or had tried using a natural baby care product in the past.

A baby wash/shampoo composition was prepared according to the formulation in TABLE 1, and was tested in a blind consumer study of 91 participants selected from the concept study based at least in part on their willingness to test the product for a two week period. Participants completed a survey about 40 minutes after using the baby wash on their child. More than 95% of the participants stated that the composition was tear-free and gentle on their children's skin, and rinsed off easily. Similar results were obtained when the composition was pediatrician and dermatologist tested.

TABLE 1

| Ingredient | Active amount (% w/w) |
| --- | --- |
| water | 45-90 |
| sodium cocoyl glutamate | 1-3 |
| sodium cocoyl isethionate | 0.9-2.7 |
| lauroyl/myristoyl methyl glucamide | 0.65-2 |
| coco-betaine | 0.6-1.8 |
| glycerin | 0.5-1.5 |
| benzyl alcohol | 0.4-1.2 |
| fragrance | 0.25-0.75 |
| citric acid | 0.2-0.6 |
| capryloyl/caproyl methyl glucamide | 0.15-0.45 |
| ethylhexylglycerin | 0.09-0.27 |
| saccharide isomerate | 0.02-0.05 |
| trisodium ethylenediamine disuccinate | 0.01-0.03 |

TABLE 1-continued

| Ingredient | Active amount (% w/w) |
| --- | --- |
| *Calendula officinalis* flower extract | 0.0025-0.0075 |
| tocopherol | 0.0005-0.0015 |
| sodium citrate | 0.00013-0.00038 |

In further laboratory studies, the ocular safety of several baby wash formulations was evaluated by utilizing the OPTISAFE™ test method. This in vitro ocular irritation test is a standardized and quantitative acute ocular irritation test method that can be used to determine the irritation potential of a wide variety of consumer products. Formulation 1 contained capryloyl/caproyl methyl glucamide, lauroyl/myristoyl methyl glucamide, coco-betaine, sodium cocoyl glycinate, and reduced fragrance (0.3 w/w). Formulation 2 contained capryloyl/caproyl methyl glucamide, lauroyl/myristoyl methyl glucamide, coco-betaine, sodium cocoyl glutamate, and reduced fragrance (0.3 w/w). Formulation 3 contained capryloyl/caproyl methyl glucamide, lauroyl/myristoyl methyl glucamide, coco-betaine, sodium cocoyl glutamate, and reduced fragrance (0.5 w/w). As indicated by the results presented in TABLE 2, each formulation was a non-irritant on the OPTISAFE™ Irritation Scale and by Globally Harmonized System (GHS) Classification (TABLE 3).

TABLE 2

| | Formulation | | | |
| --- | --- | --- | --- | --- |
| % Dilution (10% diluted) | 1 | 2 | 3 | Competitive Product |
| 1 | 4.8 | 4.8 | 4.6 | 4.5 |
| 5 | 4.3 | 4.1 | 4.7 | 4.1 |
| 10 | 4.3 | 5.3 | 4.2 | 4.4 |
| 25 | 4.8 | 4.4 | 4.8 | 4.4 |
| 50 | 5.5 | 5.4 | 5.3 | 5 |
| OPTISAFE ™ Score | 5.5 | 5.4 | 5.3 | 5 |

TABLE 3

| OPTISAFE ™ Irritation Scale | | GHS Classification |
| --- | --- | --- |
| 0-8 | non-irritant | NC - not classified as an irritant |
| >8-12.5 | slight/mild irritant | NC - not classified as an irritant |
| >12.5-30 | mild irritant | ocular irritant |
| >30-41 | moderate irritant | ocular irritant |
| >41 | severe irritant | ocular irritant |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A foaming composition comprising:
sodium cocoyl isethionate present in an amount of about 0.9 to about 2.7% w/w of the composition,
sodium cocoyl glutamate present in an amount of about 1 to about 3% w/w of the composition, capryloyl/caproyl methyl glucamide present in an amount of about 0.1 to about 0.5% w/w of the composition, lauroyl/myristyoyl methyl glucamide present in an amount of about 0.65 to about 2% w/w of the composition, coco-betaine present in an amount of about 0.6 to about 1.8% w/w of the composition, a *Calendula officinalis* extract present in an amount of about 0.0025 to about 0.0075% w/w of the composition, glycerin present in an amount of about 0.1 to about 10% w/w of the composition, and saccharide isomerate present in an amount of about 0.003 to about 0.3% w/w of the composition, and trisodium ethylenediamine disuccinate present in an amount of about 0.01 to about 0.03% w/w of the composition.

2. The foaming composition of claim 1, wherein said composition further comprises citric acid.

3. The foaming composition of claim 2, wherein said composition comprises from about 0.2 to about 0.6% w/w citric acid.

4. The foaming composition of claim 1, wherein said composition further comprises sodium citrate.

5. The foaming composition of claim 4, wherein said composition comprises from about 0.000025 to about 0.00025% w/w sodium citrate.

6. The foaming composition of claim 1, further comprising benzyl alcohol.

7. The foaming composition of claim 6, wherein said composition comprises from about 0.08 to about 8% w/w benzyl alcohol.

8. The foaming composition of claim 1, further comprising ethylhexylglycerin.

9. The foaming composition of claim 8, wherein said composition comprises from about 0.018 to about 1.8% w/w ethylhexylglycerin.

10. The foaming composition of claim 1, further comprising tocopherol.

11. The foaming composition of claim 10, wherein said composition comprises from about 0.0005 to about 0.0015% w/w tocopherol.

12. The foaming composition of claim 1, wherein said composition does not produce a stinging or burning sensation in eyes.

13. The foaming composition of claim 1, wherein said composition has a viscosity less than 150 centipoise.

14. The foaming composition of claim 1, wherein said composition comprises from about 0.8 to about 1.2% w/w glycerin.

15. A foaming composition consisting of:
sodium cocoyl isethionate,
sodium cocoyl glutamate,
capryloyl/caproyl methyl glucamide,
lauroyl/myristyoyl methyl glucamide,
coco-betaine,
a *Calendula officinalis* extract present in an amount of about 0.0025 to about 0.0075% w/w of the composition,
glycerin,
saccharide isomerate,
citric acid,
sodium citrate,
benzyl alcohol,
ethylhexylglycerin,
trisodium ethylenediamine disuccinate,
tocopherol,
fragrance, and
water.

* * * * *

UNITED STATES PATENT AND TRADEMARK OFFICE
CERTIFICATE OF CORRECTION

| | | |
|---|---|---|
| PATENT NO. | : 12,491,142 B2 | Page 1 of 1 |
| APPLICATION NO. | : 17/565952 | |
| DATED | : December 9, 2025 | |
| INVENTOR(S) | : Rebecca L. Zehntner | |

It is certified that error appears in the above-identified patent and that said Letters Patent is hereby corrected as shown below:

In the Claims

In Column 7, Line 3, In Claim 1, delete "lauroyl/myristyoyl" and insert -- lauroyl/myristoyl --.

In Column 8, Line 20, In Claim 15, delete "lauroyl/myristyoyl" and insert -- lauroyl/myristoyl --.

Signed and Sealed this
Twentieth Day of January, 2026

John A. Squires
*Director of the United States Patent and Trademark Office*